UNITED STATES PATENT OFFICE.

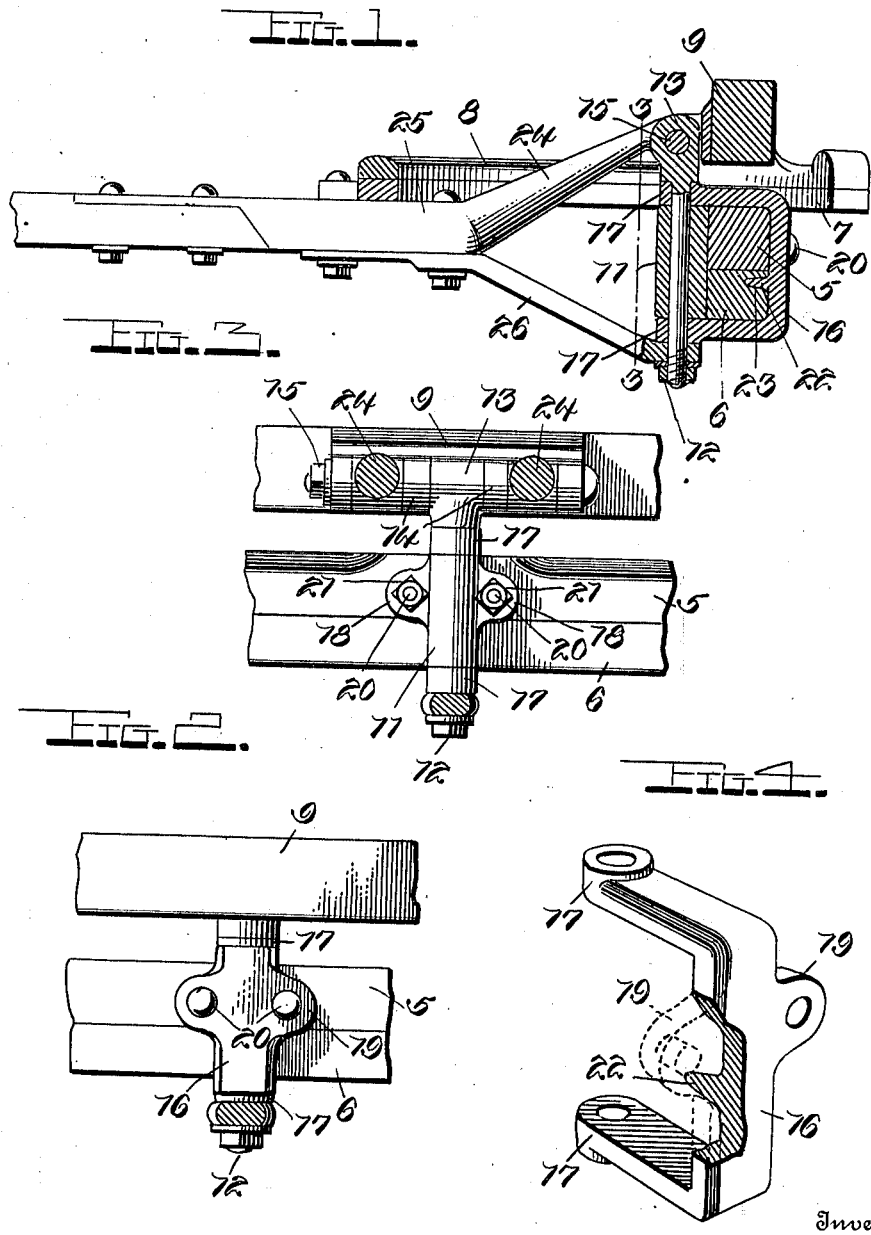

SANDERS CRAIG, OF EAGLE STATION, KENTUCKY.

FIFTH-WHEEL FOR VEHICLES.

993,035.  Specification of Letters Patent.  Patented May 23, 1911.

Application filed March 9, 1911. Serial No. 613,273.

*To all whom it may concern:*

Be it known that I, SANDERS CRAIG, a citizen of the United States, residing at Eagle Station, in the county of Carroll and State of Kentucky, have invented certain new and useful Improvements in Fifth-Wheels for Vehicles, of which the following is a specification, reference being had to the accompanying drawings.

This invention relates to certain new and useful improvements in fifth wheels for vehicles of that character shown and described in Patent #961,844 issued to me June 21st, 1910, the present invention having for its object the provision of means whereby a very rigid mounting for the fifth wheel upon the vehicle axle is secured.

A further object of the invention is to provide new and improved means for mounting the fifth wheel upon the axle and sand board whereby it may be easily and quickly applied or removed.

With the above and other objects in view, the invention consists of the novel feature of construction, combination and arrangement of parts hereinafter fully described and claimed, and illustrated in the accompanying drawings, in which—

Figure 1 is a vertical section of a vehicle axle showing my improved fifth wheel mounting applied thereto; Fig. 2 is a rear elevation; Fig. 3 is a section taken on the line 3—3 of Fig. 1; and Fig. 4 is a detail perspective view of the attaching yoke.

Referring more particularly to the drawing 5 indicates the sand board which is arranged beneath the body of the vehicle. The vehicle axle 6 is disposed beneath the sand board and extends beyond the opposite ends thereof. The vehicle wheels are mounted upon the ends of the axle in the usual manner. To the sand board 5 the arms 7 are secured and project forwardly and rearwardly thereof and move upon the under surface of the fifth wheel as will readily appear from an inspection of the drawing.

The fifth wheel proper consists of a semicircular bar 8 which is disposed upon and secured to the ends of a head block 9.

To one side of the sand board at its center a vertically disposed sleeve 11 is rigidly secured. Through this sleeve the king bolt 12 is disposed. The upper end of this bolt has an eye 13 formed thereon for arrangement between the ears 14 formed on the head block, a pin 15 extending through said eye and the ears.

A yoke bar 16 is arranged upon the axle bar and sand board, the ends of said yoke bar extending rearwardly and having cylindrical bosses 17 formed thereon which are provided with openings through which the king bolt 12 is disposed. The sleeve 11 is provided with oppositely extending ears 18, and the intermediate portion of the yoke bar 16 has formed thereon similar ears 19. Bolts 20 are disposed through the sand board and through said ears of the sleeve and yoke, suitable nuts 21 being threaded on the rearward ends of said bolts to rigidly secure the yoke and sleeve to the board. The intermediate portion of the yoke has also formed thereon a spur 22 which is adapted to be received in an indentation or socket 23 in the front face of the axle bar. This spur effectually prevents all liability of longitudinal movement of the yoke bar in the event that the bolts 20 should become loose. In this manner the tendency of the fifth wheel to shift transversely beneath the body of the vehicle is overcome and said wheel is at all times rigidly retained in position on the axle. The head block is also supported from the running gear of the vehicle by means of the arms 24 which are formed upon the attaching bars 25 which are secured to the running gear. The strengthening bars 26 are also arranged upon the under sides of the attaching bars and are connected to the lower end of the king bolt in the manner set forth in my prior patent. The construction of the wheel itself is substantially the same as that disclosed in my former patent, the invention in the present application residing solely in the manner of attaching and supporting the wheel structure upon the vehicle axle.

From the foregoing it is thought that the construction and operation of my improved mounting for fifth wheels will be readily understood.

The device is simple, extremely durable and inexpensive in construction and may be easily and quickly applied to or removed from the vehicle axle.

While I have shown and described the preferred construction and arrangement of the invention, it will be understood that various minor changes in the form, proportion and details thereof may be resorted to without departing from the essential feature or sacrificing any of the advantages of the invention.

Having thus described the invention what is claimed is:—

1. In a device of the character described, the combination with a sand board and vehicle axle, of a fifth wheel disposed upon said sand board, a sleeve vertically arranged upon one side of the sand board and axle and having laterally extending ears disposed upon the face of the sand board, a yoke bar embracing the sand board and axle and having its ends disposed upon the ends of the sleeve and provided with openings alining with the bore of the sleeve, the intermediate portion of said yoke bar having ears formed thereon disposed upon the opposite face of the sand board to the ears on the sleeve, a king bolt connected to the fifth wheel extending through the ends of the yoke bar and through the sleeve, and fastening bolts transversely disposed through the sand board and the ears of said yoke bar and sleeve to rigidly secure the same to the board.

2. In a device of the character described, the combination with a sand board and vehicle axle, of a fifth wheel disposed upon said sand board, a sleeve disposed upon one side of the sand board and axle and having ears formed thereon, a yoke bar embracing the sand board and axle having a cylindrical enlargement formed on each of its ends provided with an opening alining with the bore of the sleeve, the intermediate portion of the yoke bar having ears formed thereon disposed upon the opposite side of the sand board to the ears on the sleeve, said intermediate portion of the yoke bar also having a spur formed thereon adapted to be seated in a socket formed in the vehicle axle, a king bolt connected to the fifth wheel extending through the ends of the yoke bar and through said sleeve, and fastening bolts transversely disposed through the sand board and through the ears of the sleeve and yoke bar to rigidly secure the same thereon.

In testimony whereof I hereunto affix my signature in the presence of two witnesses.

SANDERS CRAIG.

Witnesses:
GEO. S. LIVINGSTON,
L. G. ELLIS.

---

Copies of this patent may be obtained for five cents each, by addressing the "Commissioner of Patents, Washington, D. C."